United States Patent [19]

Suchoski, Jr. et al.

[11] Patent Number: 4,984,861
[45] Date of Patent: Jan. 15, 1991

[54] LOW-LOSS PROTON EXCHANGED WAVEGUIDES FOR ACTIVE INTEGRATED OPTIC DEVICES AND METHOD OF MAKING SAME

[75] Inventors: Paul G. Suchoski, Jr., East Hartford; Talal K. Findakly; Frederick J. Leonberger, both of Glastonbury, all of Conn.

[73] Assignee: United Technologies Corporation, Hartford, Conn.

[21] Appl. No.: 329,123

[22] Filed: Mar. 27, 1989

[51] Int. Cl.$^5$ .......................... G02B 6/12; G02B 6/26; H01L 21/265
[52] U.S. Cl. .............................. 350/96.11; 350/96.12; 350/96.14; 350/96.15; 350/320; 437/24; 437/51
[58] Field of Search ............... 350/96.11, 96.12, 96.13, 350/96.14, 96.15, 320, 374, 375, 376; 437/16, 17, 18, 20, 24, 51

[56] References Cited

U.S. PATENT DOCUMENTS

| | | | |
|---|---|---|---|
| 4,679,893 | 7/1987 | Ramer | 350/96.14 |
| 4,728,167 | 3/1988 | Soref et al. | 350/96.13 |
| 4,746,183 | 5/1988 | Soref et al. | 350/96.14 |
| 4,775,208 | 10/1988 | Robinson et al. | 350/96.14 |
| 4,925,263 | 5/1990 | Sanford et al. | 350/96.12 |

OTHER PUBLICATIONS

R. C. Alferness, *Waveguide Electrooptic Modulator*, IEEE Trans. Microwave Theory and Tech. MTT-30, p. 1121 (1982).
J. L. Jackel and C. E. Rice, *Variation in Waveguides Fabricated by Immersion of LiNbO₃ in AgNO₃ and TlNO₃: the Role of Hydrogen*, Appl. Phys. Lett. 41, p. 508 (1982).
J. L. Jackel, C. E. Rice and J. J. Veselka, *Proton Exchange for High Index Waveguides in LiNO₃*, Appl. Phys. Lett. 41, p. 607 (1982).
J. L. Jackel, A. M. Glass, G. E. Peterson, C. E. Rice, D. H. Olson, and J. J. Veselka, *Damage-Resistance LiNbO₃ Waveguides*, J. Appl. Phys. 55, p. 269 (1983).
D. F. Clark, A. C. G. Nutt, K. K. Wong, P. J. R. Laybourn, and R. M. De La Rue, *Characterization of Proton-Exchange Slab Optical Waveguides in Z-Cut LiNO₃*, J. Appl. Phys. 54, p. 6218 (1983).
A. Yi-Yan, *Index Instabilities in Proton-Exchanged LiNO₃ Waveguides*, Appl. Phys. Lett. 42, p. 633 (1983).
R. A. Becker, *Comparison of Guided-Wave Interferometric Modulators Fabricated on LiNO₃ via Ti Indiffusion and Proton Exchange*, Appl. Phys. Lett. 43, p. 131 (1983).
M. Minakata, K. Kumagai, and S. Kawakami, *Lattice Constant Changes and Electro-Optic Effects in Proton–Exchanged LiNbO₃ Optical Waveguides*, Appl. Phys. Lett. 49, p. 992 (1986).
K. K. Wong, R. M. De La Rue, and S. Wright, *Electro-Optic-Waveguide Frequency Translator in LiNbO₃ Fabricated by Proton Exchange*, Opt. Lett. 7, p. 546 (1982).
J. L. Jackel, C. E. Rice, and J. J. Veselka, *Composition Control in Proton Exchanged LiNO₃*, Electron. Lett. 19, p. 387 (1983).
J. L. Jackel and C. E. Rice, *Short-and-Long-Term Stability in Proton Exchanged Lithium Niobate Waveguides*, SPIE vol. 460, Processing of Guided Wave Optoelectronic Materials, p. 43, (1984).
M. M. Abou el leil and F. J. Leonberger, *Waveguides in LiNbO₃ by Diluted Proton Ion-Exchange*, Am. Ceramic Soc. Ann. Mtg., Pittsburgh, Apr. 26-30, paper 53-EP-87, 1987.

(List continued on next page.)

*Primary Examiner*—Brian Healy
*Attorney, Agent, or Firm*—Dominic J. Chiantera

[57] ABSTRACT

A single polarization active IO device includes a crystalline material substrate having an IO circuit array comprising an optical waveguide array disposed on a major surface of the substrate by a two step proton exchange (TSPE) process, and including an electrode array disposed on the major surface in juxtaposed relation with the waveguide array to provide one or more active IO regions thereon.

22 Claims, 2 Drawing Sheets

OTHER PUBLICATIONS

T. K. Findakly and B. Chen, *Single-Mode Transmission Selective Integrated-Optical Polarizers in LiNbO₃*, Electron. Lett. 20, p. 128 (1984).

J. J. Veselka and G. A. Bogert, *Low-Insertion-Loss Channel Waveguides in LiNbO₃ Fabricated by Proton Exchange*, Electron. Lett. 23, p. 265 (1987).

J. J. Veselka and G. A. Bogert, *Low-Loss TM-Pass Polarizer Fabricated by Proton Exchange for Z-Cut Ti: LiNbO₃ Waveguides*, Electron. Lett. 23, p. 29 (1982).

P. G. Suchoski, T. K. Findakly, and F. J. Leonberger, *Low-Loss High-Extinction Polarizers Fabricated in LiNbO₃ by Proton Exchange*, to be published in Opt. Lett. in Feb. 1988.

P. C. Suchoski, M. M. Abou el leil, T. K. Findakly, and F. J. Leonberger, *Low-Loss-Proton-Exchanged LiNbO₃ Waveguides with No Electrooptic Degradation*, Integrated and Guided Wave Optics (IGWO) Conf., Santa Fe, N.M., Mar. 28-30, paper MD4, 1988.

LOW-LOSS PROTON EXCHANGED WAVEGUIDES FOR ACTIVE INTEGRATED OPTIC DEVICES AND METHOD OF MAKING SAME

CROSS REFERENCE TO RELATED APPLICATIONS

Some of the subject matter disclosed and claimed herein is also disclosed and claimed in one or more of the following commonly owned, copending U.S. patent applications filed on even date herewith by Suchoski, Jr. et al, Ser. No. 328,940 entitled *Integrated Optic Star Coupler;* and Suchoski, Jr. et al, Ser. No. 329,121, entitled *Single-Polarization, Integrated Optical Components For Optical Gyroscopes.*

TECHNICAL FIELD

This invention relates to proton-exchanged active guided wave devices (including intensity and phase modulators), and more particularly to annealed proton-exchanged active devices in $LiNbO_3$ and $LiTaO_3$.

BACKGROUND ART $LiNbO_3$ and $LiTaO_3$ integrated optic circuits (IOCs) are useful in fiber optic gyros (FOGs), photonic switching devices, and intensity/phase modulation systems. Their attributes include low optical loss, low voltage drive, high frequency bandwidth, and small size and weight.

The principal prior art method of fabricating $LiNbO_3$ IOCs is by local diffusion of titanium (Ti) into a $LiNbO_3$ or $LiTaO_3$ substrate surface (i.e. $Ti:LiNbO_3$ or $Ti:LiTaO_3$). Through deposition and photolithographic techniques, a Ti pattern is defined and diffused to form optical waveguides on the substrate surface. The titanium diffuses to interstitial sites of the defined waveguide region, acting as an impurity dopant. This increases the ordinary and extraordinary refractive indices of the $LiNbO_3$ or $LiTaO_3$ substrate in that region, causing optical wave propagation of either polarization to be confined to the formed waveguide region by total internal reflection.

An alternative prior art method for fabricating optical waveguides in $LiNbO_3$ and $LiTaO_3$ is the proton exchange (PE) process. A masked $LiNbO_3$ or $LiTaO_3$ substrate is immersed in a molten bath of pure benzoic acid at a temperature below the decomposition point of the acid, causing lithium ions from the $LiNbO_3$ surface region to be replaced by hydrogen ions from the bath. The process locally increases the extraordinary refractive index but decreases the ordinary refractive index, producing a polarizing waveguide. Light polarized along the extraordinary axis is guided but light polarized along the ordinary axis is not guided and leaks into the substrate.

In addition to supporting a single polarization the PE waveguides are easy to fabricate. PE diffusion occurs at 150–250° C. for 5–30 minutes compared to 900–1100° C. for 4–10 hours for the titanium-diffused guides. The PE waveguides fabricated in pure benzoic acid offer a larger refractive index change and, therefore, a tighter mode confinement than the Ti-diffused guides, and they are more immune to optical damage; however, they have four drawbacks.

First, they exhibit large propagation loss due to scattering. Second, the large index increase ($\approx 0.12$) causes a large mismatch in numerical aperture with commercially available single mode fibers. Third, there are temporal instabilities in the refractive index distribution causing the propagation characteristics to vary with time. Fourth, and most important, there is evidence that the proton exchange process substantially degrades the electrooptic properties of the $LiNbO_3$, making the PE guides less useful for active devices.

There have been prior art attempts to overcome these problems. One known improvement involves diluting the benzoic acid bath with a small percentage of lithium benzoate, to decrease the amount of $Li^+$ being exchanged with $H^+$. As reported by J. L. Jackel and C. E. Rice, *Short And Long-term Stability in Proton Exchanged Lithium Niobate Waveguides,* SPIE vol. 460, Processing of Guided Wave Optoelectronic Materials (1984), p. 43, for lithium benzoate concentrations greater than 3.5% the increase in refractive index is reduced by an order of magnitude. The range of index increase was 0.005 to 0.01 compared to a range of 0.10 to 0.12 for concentrations less than 3.5%. Metastable phases are not formed in $LiNbO_3$ for lithium benzoate concentrations greater than 3.4% so that the waveguides are temporally stable.

A second and more practical method for making useful polarizing waveguides by the PE technique was demonstrated and reported by T. Findakly and B. Chen, *Single-Mode Transmission Selective Integrated Optical Polarizers in $LiNbO_3$,* Electronics Letters, 1984, Vol. 20, pp. 128–129. The method known as the annealed-proton-exchange, performs two steps in which the waveguide is first formed by exchange in pure benzoic acid and then annealed at higher temperature for a proper duration. The annealing reduces the initial large index increase and expands the waveguide depth such that the waveguide numerical aperture can be properly matched to other single mode waveguides or commercial fibers. The same technique was also verified by J. J. Veselka and G. A. Bogert, *Low Insertion Loss Channel Waveguides in $LiNbO_3$ Fabricated by Proton Exchange,* Electron. Lett. 23, p. 265 (1987).

Despite these improvements, the scientific community has not endorsed the use of proton exchange fabricated devices (fabricated by pure proton exchange without annealing) for active IO applications, such as switches and modulators. This is due to the poor temporal stabilities and low electrooptic efficiencies which have continued to be demonstrated by prior art devices. See for example: Nishihara et al. *Optical Integrated Circuits,* McGraw Hill Book Company, U.S.A., 1989, pp 161, and Theodor Tamir, *Guided-Wave Optoelectronics,* Springer-Verlag, West Germany, 1988, pps. 149–150.

DISCLOSURE OF INVENTION

The object of the present invention is to provide single polarization, active integrated optic (IO) devices.

According to the present invention, a single polarization IO device includes an IO circuit array having an optical waveguide array and an electrode array disposed in juxtaposition on a major surface of a crystalline material substrate, said optical waveguide array being formed in said major surface by a two step proton exchange (TSPE) process comprising the steps of: immersing said substrate for a period of from two to sixty minutes in a benzoic acid bath at a temperature of from 150° C. to 250° C., and then annealing said bathed substrate for a period of from one to five hours at a temperature of from 300° C. to 400° C.

In still further accord with the present invention, the substrate material comprises either $LiNbO_3$ or $LiTaO_3$.

In still further accord with the present invention, the substrate material may include an X-cut, Z-cut, or Y-cut crystal orientation.

The single polarization IO devices of the present invention retain the electrooptic properties of the undoped LiNbO₃ and LiTaO₃ bulk material. They are low loss, single-polarization, and are compatible with either single-mode or polarization preserving optical fibers. This makes them extremely attractive for active integrated optical devices for use as fiber optic gyro (FOG) IO chips, intensity and/or phase modulators, and switching networks. The electrode array is deposited and patterned using photolithographic techniques and electrode materials well known in the art.

These and other objects of the present invention will become more apparent in light of the following detailed description of a best mode embodiment thereof, as illustrated in the accompanying Drawing.

BEST MODE FOR CARRYING OUT THE INVENTION

In the present invention active IO devices are fabricated using various combinations of PE waveguides. A two step proton exchange (TSPE) process is used to create waveguide structures in either LiNbO₃ or LiTaO₃ crystalline materials.

In the prior art, it is known to use the TSPE process for fabricating passive IO devices, such as waveguides. Active IO device fabrication has been almost exclusively through the use of titanium diffusion techniques. Similarly, LiNbO₃ has been the dominant material despite the fact that LiTaO₃ has strong electrooptic properties ($r_{33}$ is almost the same as that of lithium niobate), and lower susceptibility to optical damage (approximately one to two orders of magnitude lower than that of lithium niobate).

The lower popularity of LiTaO₃ is due primarily to the fact that its Curie temperature ($T_c$ is approximately 600° C.) is lower than the temperature needed for waveguide fabrication by metal indiffusion (typically 1000° C.). Because of domain inversion, crystal poling is required after diffusion in order to restore domain alignment and maximize the electrooptic effect for active devices; all of which adds to the fabrication complexity. These limitations, however, are not present in the TSPE process of the present invention.

Figures 1, 2:
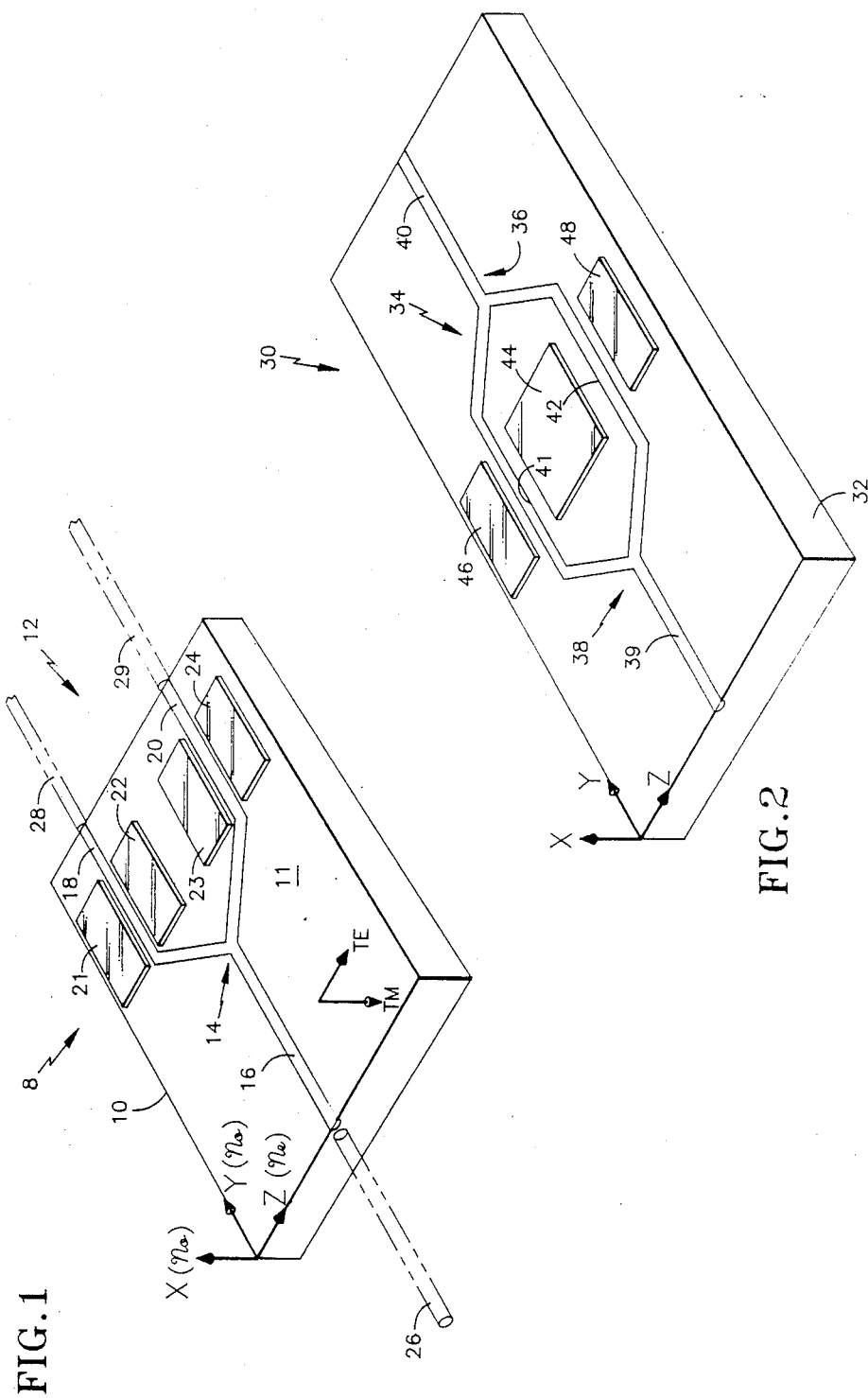
FIG. 1 is a perspective illustration of a fiber optic gyro (FOG) IO chip used in the description of the TSPE process of the present invention.
FIG. 2 is a perspective illustration of one embodiment of an IO interferometer according to the present invention.

Referring to FIG. 1, a FOG IO circuit 8 includes an X cut crystalline substrate 10, having a major surface 11. An optical waveguide array 12 is formed on the major surface. The FIG. 1 waveguide array is only exemplary, but includes a Y junction 14, an input guide section 16, and output guide sections 18, 20. The IO circuit further includes an electrode array comprising the paired electrodes 21, 22, and 23, 24; each defining IO phase modulators. The IO circuit connects to other host system elements through input and output optic fibers 26, and 28, 29 respectively, which are shown in phantom. The fibers are connected to the substrate's input and output guide sections using well known pigtail techniques.

Due to the lower temperatures of the TSPE process as opposed to the indiffusion techniques, the substrate material may be either LiNbO₃ or LiTaO₃. In the waveguide device of FIG. 1 it is assumed that the substrate is X-cut crystal, which is the preferred orientation for this circuit geometry. However, Z-cut and Y-cut crystal may also be used.

The fabrication process begins with deposition of a masking layer of material, such as aluminum (Al), chromium (Cr), titanium (Ti), or silicon oxide (SiO₂), deposited on the substrate surface 11. A photoresist film is then deposited, ultraviolet-exposed through a mask, and developed to duplicate the masking pattern on the surface to form the Y junctioned waveguide 12, and the pattern is etched to produce the waveguide channels on the surface 11. The channel widths vary with the intended guided signal wavelength, but range from 3 to 10 microns. The masking pattern limits the proton exchange to the channel etched areas.

The crystal substrate is then immersed in a pure (concentrated) benzoic acid bath for a time ranging from two to sixty minutes. The molten benzoic acid is at a temperature in the range of from 150° C. to 250° C. The crystal is then annealed at temperature in the range of from 300° C. to 400° C. for a period of from one to five hours.

The TSPE process locally increases the extraordinary refractive index (within the waveguide channels) and locally decreases the ordinary refractive index. As a result, in the case of the FIG. 1 waveguide with X-cut orientation, it is possible to support a guided optical mode polarized along the Z axis (extraordinary axis) by total internal reflection.

To make active IO devices, a metallic electrode pattern is formed by deposition and photolithographic methods as described earlier to generate appropriate electrode patterns (44), (46), (48), such a shown in FIG. 2. To utilize the electrooptic properties, an external electric field is applied to the device through the electrodes.

The stability of the TSPE waveguides was evaluated by comparing the measured fiber-waveguide insertion loss and the Mach-Zehnder switching voltages over time. Within experimental error, neither parameter varied over a six-month period in PE devices which were stored at room temperature. In addition, the fiber-waveguide insertion loss did not vary in samples which were stored at 150° C. for a three-week period.

FIG. 2 illustrates a Mach-Zehnder interferometer 30 fabricated with the TSPE process of the present invention. The interferometer comprises a crystalline material substrate 32, such as LiNbO₃ or LiTaO₃. The substrate material is X-cut, with the extraordinary axis ($n_e$) along the Z axis, which supports TE mode polarization. The substrate includes a PE waveguide array 34, with double Y sections 36, 38 with the Y-junction stem sections 39, 40, and guided sections 41, 42. The interferometer embodiment shown is a push-pull type having a common (or ground) electrode 44 and power electrodes 46, 48 deposited by known photolithograpic techniques.

In operation, optical power in guide 39 is split equally by the Y-junction 38 into the guides 41, 42, and recombine in the Y-junction 36. The optical path length of the guides 41, 42 (between the Y-junctions 36, 38) can be selectively changed by applying electric potentials between the electrodes 44-48, creating electric fields in the substrate. The electrooptic effect of the applied electric field changes the substrate index of refraction, to effectively change the optical path length.

The electrooptic efficiency of the PE waveguides was determined by comparing the measured voltage response of, for example, Mach-Zehnder interferometers to theoretical predictions. The $V_\pi$ of a Mach-Zehnder with push-pull electrodes is:

$$V_\pi = \frac{G}{2(n_e)^3 \cdot r_{33} \cdot \Gamma \cdot L}$$

where G is the electrode gap, $\Gamma$ is the overlap integral between the optical and modulating fields, and L is the electrode length. For the device parameters used in this work, we expect $\Gamma$ to be in the 0.4 to 0.45 range for both the x- and z-cut devices [9] and thus, the 0.8 μm, x-cut device to have $2.0 < V_\pi < 2.25$ Volts and the 1.55 μm, z-cut device to have $8.3 < V_\pi$ 9.4 Volts. The measured switching voltages for the 0.8 and 1.55 μm Mach-Zehnders are 2 and 9 Volts, respectively. The excellent agreement between the measured and theoretical values indicates that there is no electrooptic degradation in the TSPE waveguides. Similar results were obtained for the Mach-Zehnder interferometers which were fabricated using diluted proton exchange.

Figure 3:
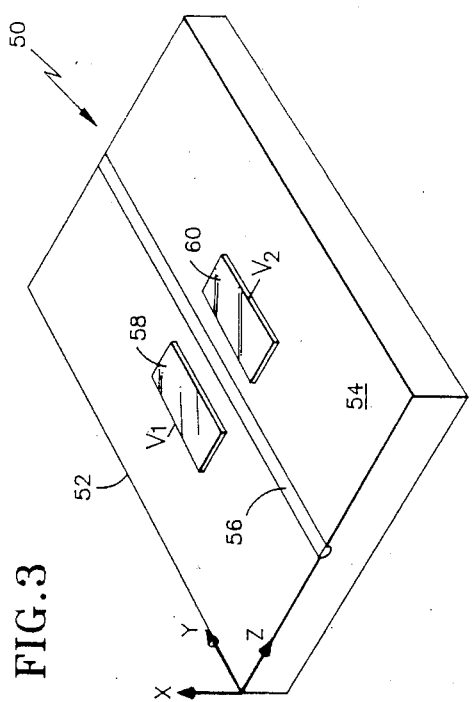
FIG. 3 is a perspective illustration of one embodiment of an IO phase modulator according to the present invention.

FIG. 3 illustrates an IO phase modulator 50 according to the present invention. The modulator includes a substrate 52 of either LiNbO3 or LiTaO3, and having a major surface 54. A waveguide array comprises the single waveguide 56 deposited on the surface using the TSPE process described hereinbefore. The substrate preferably has an X-cut orientation, however, both Z-cut and Y-cut crystal may be used.

An electrode array includes electrodes 58, 60 deposited on the surface 54 using known photolithograpic techniques. In operation, voltages $V_1$, $V_2$ applied to the electrodes 58, 60 cause local variation of the substrate refractive index by the electrooptic effect. These variations change the phase velocity of an optical signal propagating through the waveguide 56.

Figure 4:
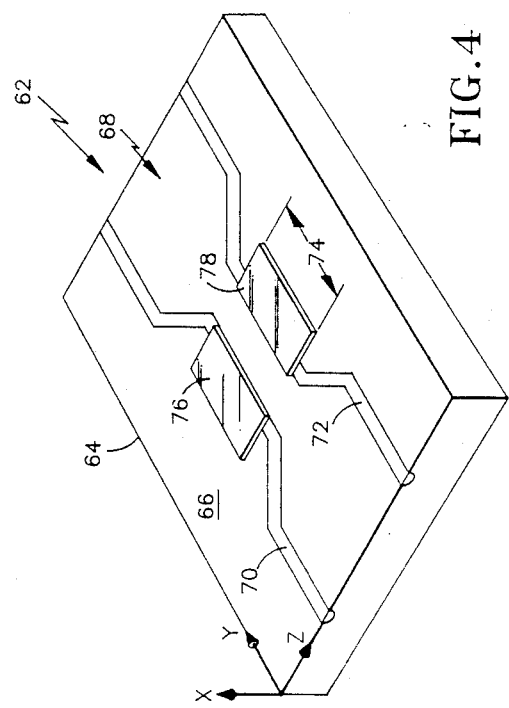
FIG. 4 is a perspective illustration of one embodiment of a directional coupler according to the present invention.

FIG. 4 illustrates an IO directional coupler 62 according to the present invention. The coupler includes a substrate 64 of either LiNbO3 or LiTaO3, and having a major surface 66. Again, the substrate is preferably X-cut orientation, but Z-cut and Y-cut crystal may be used. A waveguide array 68 having dual guides 70, 72 is deposited on surface 64 using the TSPE process. The waveguides are proximity coupled in the region 74.

An electrode array includes electrodes 76, 78 deposited on the surface 66 using known photolithograpic techniques. In operation, voltages $V_1$, $V_2$ applied to the electrodes 76, 78 control, through the electrooptic effect, the amount of power coupled between the guides 70, 72. The electrooptic effect tunes the wavevectors of the optical signals propagating through the guides.

The present invention includes the fabrication of active IO devices using the TSPE process. An active IO device may be generically defined as any device in which the refractive index in an optically guided circuit can be instantaneously changed through the electrooptic effect by application of external electric fields.

Although the invention has been shown and described with respect to a best mode embodiment thereof, it should be understood by those skilled in the art that the foregoing and various other changes, ommisions, and additions in the form and detail thereof, may be made therein without departing from the spirit and scope of this invention.

We claim:

1. An active integrated optic (IO) device, comprising:
   a crystalline material substrate, having a major surface; and
   an IO circuit array, including an optical waveguide array and an electrode array disposed in juxtaposition on said major surface to provide one or more IO regions thereon;
   as characterized by:
   said optical waveguide array being formed in said major surface by a two step proton exchange (TSPE) process comprising the steps of:
   immersing said substrate, for a period of from two to sixty minutes, in a benzoic acid bath at a temperature of from 150° C. to 250° C.; and
   annealing said substrate for a period of from one to five hours at a temperature of from 300° C. to 400° C.

2. The active IO device of claim 1, wherein said IOC substrate material comprises LiNbO3.

3. The active IO device of claim 1, wherein said IOC substrate material comprises LiTaO3.

4. The active IO device of claim 2, wherein said substrate material further comprises X-cut crystal material.

5. The active IO device of claim 3, wherein said substrate material further comprises X-cut crystal material.

6. The active IO device of claim 2, wherein said substrate material further comprises Z-cut crystal material.

7. The active IO device of claim 3, wherein said substrate material further comprises Z-cut crystal material.

8. The active IO device of claim 2, wherein said substrate material further comprises Y-cut crystal material.

9. The active IO device of claim 3, wherein said substrate material further comprises Y-cut crystal material.

10. The active IO device of claim 1, wherein said IO circuit array comprises a directional coupler.

11. The active IO device of claim 1, wherein said IO circuit array comprises a phase modulator.

12. The active IO device of claim 1, wherein said IO circuit array comprises a Mach-Zehnder interferometer.

13. Integrated optic (IO) apparatus for changing the refractive index of an optically guided channel by the electrooptic effect, comprising:
   a refractive material substrate, having a major surface;
   waveguide array means, disposed on said major surface as an arrangement of optically guided channels by a two step proton exchange (TSPE) process including immersion of said substrate from two to sixty minutes in benzoic acid heated from 150° C. to 250°, followed by annealing of said substrate for a period of from one to five hours; and
   electrode array, disposed on one or more portions of said major surface, in spatial juxtaposition to said optically guided channels, to provide an electrode pattern in designated interference regions of said substrate for providing, in response to voltage potential signals applied to said electrode pattern, an electrooptic effect modulation of the refractive index of said substrate material in said guided channels so as to alter the propagation characteristics of optical signals propagating through said optically guided channels.

14. The active IO device of claim 13 wherein said refractive material substrate comprises LiNbO$_3$.

15. The IO apparatus of claim 13 wherein said refractive material substrate comprises X-cut LiNbO$_3$.

16. The IO apparatus of claim 13 wherein said refractive material substrate comprises LiTaO$_3$.

17. The IO apparatus of claim 13 wherein said refractive material substrate comprises X-cut LiNbO$_3$.

18. The method of fabricating proton exchanged (PE) IO devices, comprising the steps of:

preparing a crystalline material substrate to provide a major surface thereon;

etching channels in said major surface to produce a selected IO device waveguide geometry thereon;

immersing the substrate in benzoic acid at a bath temperature in the range of from 150° C. to 250° C. for a period of from two to sixty minutes, and then removing the substrate; and annealing the substrate at a temperature in the range of from 300° C. to 400° C. for a period of from one hour to five hours.

19. The method of claim 18 wherein the step of preparing includes the step of selecting substrate material comprising LiNbO$_3$.

20. The method of claim 18 wherein the step of preparing includes the step of selecting substrate material comprising LiTaO$_3$.

21. The method of claim 18, wherein the step of preparing includes the step of selecting substrate material comprising X-cut LiNbO$_3$.

22. The method of claim 18, wherein the step of preparing includes the step of selecting substrate material comprising X-cut LiTaO$_3$.

* * * * *